L. MILLER.
MOTOR CONTROL SYSTEM.
APPLICATION FILED MAY 6, 1919.

1,370,034.

Patented Mar. 1, 1921.
4 SHEETS—SHEET 1.

WITNESSES:

INVENTOR
Leonard Miller
BY
ATTORNEY

L. MILLER.
MOTOR CONTROL SYSTEM.
APPLICATION FILED MAY 6, 1919.

1,370,034.

Patented Mar. 1, 1921.
4 SHEETS—SHEET 2.

WITNESSES:
H. J. Shelhamer
David Rines

INVENTOR
Leonard Miller
BY
Wesley G. Carr
ATTORNEY

L. MILLER.
MOTOR CONTROL SYSTEM.
APPLICATION FILED MAY 6, 1919.

1,370,034.

Patented Mar. 1, 1921.
4 SHEETS—SHEET 4.

WITNESSES:
H. J. Shelhamer
David Rines

INVENTOR
Leonard Miller
BY
Wesley G. Carr
ATTORNEY ns of my invention.
UNITED STATES PATENT OFFICE.

LEONARD MILLER, OF WHITEFIELD, ENGLAND, ASSIGNOR TO WESTINGHOUSE ELECTRIC & MANUFACTURING COMPANY, A CORPORATION OF PENNSYLVANIA.

MOTOR-CONTROL SYSTEM.

1,370,034.  Specification of Letters Patent.  Patented Mar. 1, 1921.

Application filed May 6, 1919. Serial No. 295,187.

*To all whom it may concern:*

Be it known that I, LEONARD MILLER, a subject of the King of Great Britain, and a resident of Whitefield, in the county of Lancaster, England, have invented a new and useful Improvement in Motor-Control Systems, of which the following is a specification.

My invention relates to electric-motor-control systems of the kind in which portions of the control resistor are cut into and cut out of circuit with the motor by separately actuated switches, commonly termed contactors.

The object of my invention is to provide an improved system of the above-designated character which shall be adapted for short-circuiting, or otherwise rendering inoperative, portions of the accelerating resistor only upon the current traversing the motor circuit falling to a predetermined value.

According to my invention, the switch or contactor which renders one portion of the resistor inoperative is arranged to short-circuit or render inoperative one coil of a relay which controls the actuating or controlling coil of the contactor for the next portion of the resistor and insert another coil of the said relay, which latter coil allows the relay to close the circuit through the contactor-actuating or controlling coil only when the current traversing the motor circuit has fallen to the predetermined value.

In the accompanying drawings, Figures 1 to 4, inclusive, are diagrammatic views of different embodiments of my invention.

Figure 1:
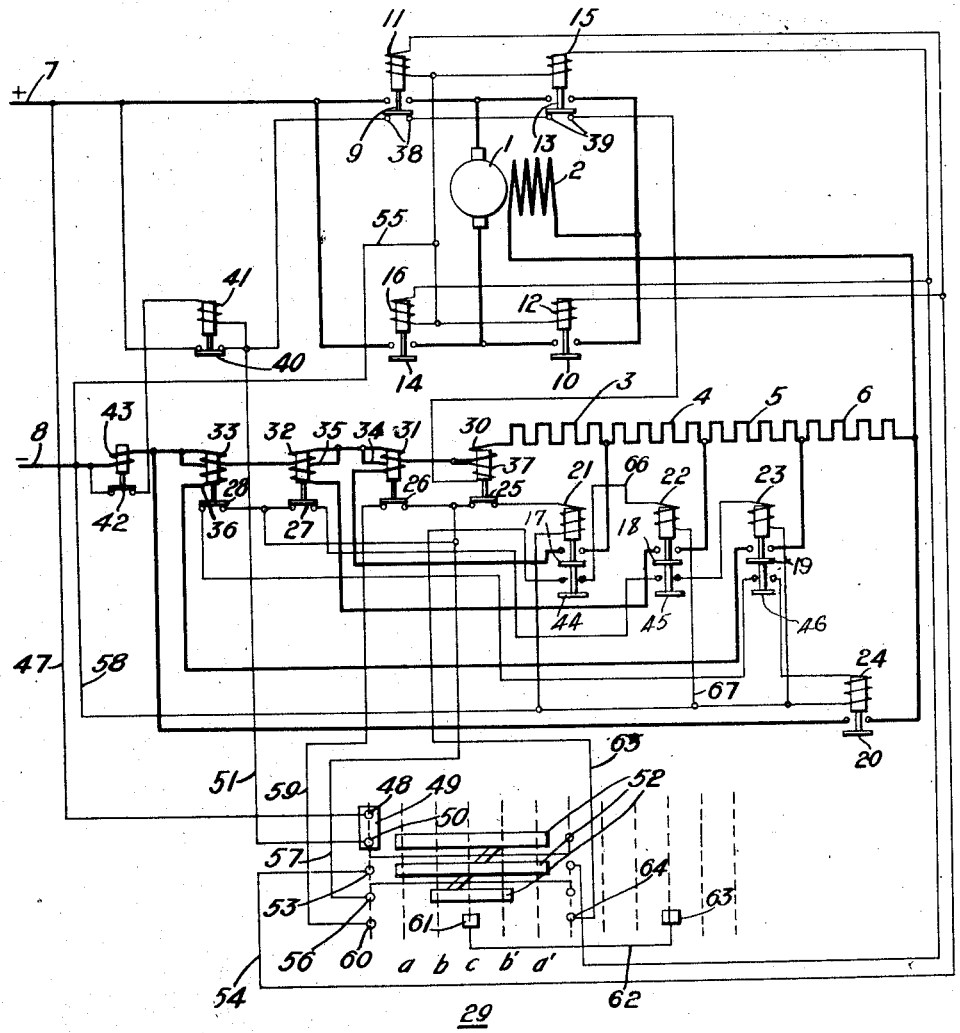

In Fig. 1, the armature 1 of a direct-current electric motor has a series field-magnet winding 2 and a resistor in series therewith, sections of which are respectively designated 3, 4, 5 and 6. The motor is adapted to be supplied with energy from the positive and negative line conductors 7 and 8. Switches or contactors for connecting the motor for rotation in a forward direction are indicated at 9 and 10 with actuating or controlling coils 11 and 12, respectively, and similar switches for the reverse direction of rotation are indicated at 13 and 14, with actuating coils 15 and 16, respectively. The several resistor sections 3, 4, 5 and 6 are adapted to be short-circuited by contactor switches 17 to 20, actuated or controlled by coils 21 to 24, respectively. The supply of current to the contactor coils 21 to 24 is controlled by relays 25 to 28, respectively, and by means of a master controller 29, which is shown as being of the usual drum type, provided with fixed and movable contact members, as will afterward be made clear in the description of the operation.

The relays 25 to 28 are each provided with two operating coils, one of which, indicated at 30 to 33, respectively, is included in series with the resistor sections 3, 4, 5 and 6, and the other of which, in the case of the relays 26 to 28, indicated at 34, 35 and 36, is included in circuit with the respective contactor switches 17, 18 and 19 which short-circuit the resistor sections 3, 4 and 5. The second operative coil 37 of the first relay 25 is included in a shunt circuit which includes contact members 38 and 39 and the no-voltage relay 40. When the contactors 9 and 10 are closed, the contact members 38 will be opened and when the contactors 13 and 14 are closed, the contact members 39 will be opened, the supply of current to the coil 37 being in either case interrupted. The no-voltage relay 40 is controlled by a coil 41, included in circuit with which is an overload relay 42 that is controlled by a coil 43. Switches 44, 45 and 46 are provided in circuit with the contactor coils 22, 23, 24, respectively, and are operated in a well known manner by the contactors 17, 18, 19 respectively so as to prevent the contactors 19 and 20 being closed except in the desired sequence.

In operation, the master controller 29, being in the "off" position, as shown in the drawings, and the normal voltage being supplied by the conductors 7 and 8, a circuit is completed from the positive line conductor 7, through conductor 47, the fixed contact member 48 of the master controller, movable contact member 49, and fixed contact member 50, conductor 51, coil 41, and overload relay 42, which is closed, to the negative line conductor 8. The coil 41 is thereby energized to close no-voltage relay 40. The positive line conductor 7 is thereby connected, through the no-voltage relay 40 and conductor 51, to the fixed contact member 50 of the master controller 29. A circuit is also completed from the positive line conductor 7, through the no-voltage relay 40, contact members 38 and 39, which are closed, and shunt coil 37 of the first relay 25, to the negative line conductor 8.

If the master controller 29 is now moved through its forward position to its full speed position, so that the fixed contact members 48, 50, 53, 56 and 60, occupy the position c, a circuit is completed from the positive line conductor 7, through the no-voltage relay 40, conductor 51, fixed contact member 50, movable contact member 52, fixed contact member 53, conductor 54, operating coils 11 and 12 of the forward contactors 9 and 10, and conductor 55, to the negative line conductor 8. Contactors 9 and 10 are thereby closed and the main circuit is completed from the positive line conductor 7, through contactor 9, motor armature 1, contactor 10, series field-magnet winding 2, resistor sections 6, 5, 4 and 3, the relay coils 30, 31, 32, 33 and overload coil 43, to negative line conductor 8. The relays 25, 26, 27 and 28 are moved to their open position by the rise of current in their respective coils 30 to 33.

Upon the closing of the forward contactors 9 and 10, the contact members 38 become opened, whereupon the coil 37 becomes deënergized, leaving the relay 25 under the control of the coil 30. When the value of the current in the main motor circuit has fallen to the predetermined normal value, the relay 25 closes, but the coils 31 to 33 are arranged so as to maintain the relays 26 to 28 open until the current falls below this value. The closure of relay 25 completes a circuit from the fixed contact member 50 of the master controller, through movable contact member 52, fixed contact member 56, conductor 57, relay 25, actuating coil 21 and conductor 58, to the negative line conductor 8. The contactor 17 is thereby closed, the resistor section 3 is short-circuited, and coil 34 is substituted for the coil 31 of the relay 26.

The voltage supplied to the motor is increased by the elimination of resistor section 3, and the current temporarily rises. When the motor current has again fallen to the predetermined value, the coil 34 permits the relay 26 to close, and a circuit is completed from fixed contact member 50 of the master controller, through movable contact member 52, fixed contact member 56, conductor 57, relay 26, conductor 59, fixed contact member 60 of the master controller, movable contact member 61, conductor 62, movable contact member 63, fixed contact member 64, with which it makes connection in position c of the master controller, conductor 65, switch 44, conductor 66, coil 22 of contactor 18, conductor 67 and conductor 58, to the negative line conductor 8. Contactor 18 is, therefore, closed, the resistor section 4 is short-circuited and coil 35 is substituted for coil 32 of the relay 27. The voltage supplied to the motor is further increased by the elimination of the resistor section 4, and the current through the motor again rises temporarily. When it has fallen to the predetermined value, the relay 27 closes and a circuit is completed from conductor 57, through relay 27, switch 45 and contactor coil 23, to conductor 58. The contactor 19 is therefore closed, short-circuiting resistor section 5 and substituting coil 36 for coil 33 of relay 28. When the current, after its initial rise, has again fallen to the predetermined value, the relay 28 closes and contactor coil 24 is energized from conductor 57, through relay 28 and switch 46. The contactor 20 is thereby closed, short-circuiting the last resistor section 6 and connecting the motor in circuit without resistance.

It will be observed that the sequence of operations above outlined may be stopped at certain stages by manipulation of the master controller. For example, if the controller is moved to the first position a, the fixed contact member 56 will not make connection with the movable contact member 52, consequently, the first contactor coil 21 cannot be energized and the motor remains with all the resistor sections 3 to 6 in circuit. If the master controller is moved to position b, the fixed contact member 56 makes contact with the movable contact member 52 and the first contactor coil 21 can be energized, but the second contactor coil 22 cannot, as the fixed contact member 60 of the master controller does not make contact with the movable contact member 61. Consequently, at this point the first resistor section 3 only is cut out of the motor circuit.

If the overload relay 42, actuated by the coil 43, causes the opening of the circuit when the master controller is in one of its operative positions a, b, or c, the coil 41 will become deënergized and the no-voltage relay 40 will, consequently, open. The fixed contact member 50 of the master controller will thereby become disconnected from the positive line conductor 7; consequently, all the contactor coils will necessarily be deënergized and the resistor sections 3 to 6 be reincluded in the motor circuit. It will, therefore, be necessary to return the master controller to the "off" position, in which the movable contact member 49 connects the fixed contact members 48 and 50, in order to reënergize the coil 41 and thereby close the no-voltage relay 40. This method of interlocking the no-voltage relay coil with the master controller is well known.

In order to obtain a reverse direction of rotation of the motor, the master controller will be moved so that the series of fixed contact members, of which the contact member 64 is one, will occupy the positions a', b', c the fixed contact member 60 making contact with movable contact member 63 in position c. The operation of the several switches is similar to that hereinabove described for the forward operation of the motor, with the exception that contactors 13 and 14 are closed instead of contactors 9 and 10 and no further description is deemed necessary.

Figure 2:
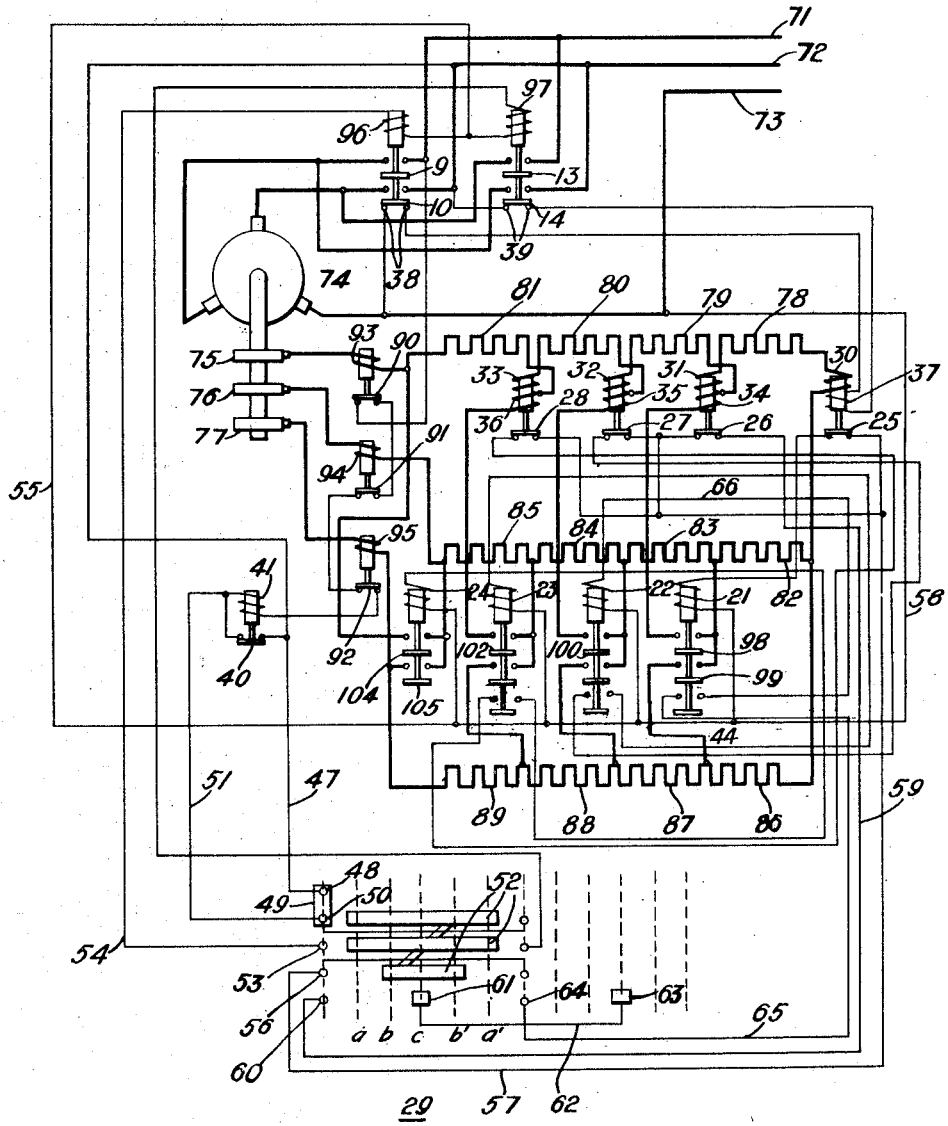

Fig. 2 is a diagrammatic view showing substantially the same system as that of Fig. 1, but applied to a three-phase, alternating-current motor. The alterations which are thereby rendered necessary will be readily understood from the drawing, in which 71, 72, 73 are the phase conductors supplying energy to the motor 74, the rotor of which is provided with slip rings 75, 76, 77 connected to resistor sections 78 to 81, 82 to 85, and 86 to 89, respectively. In place of the single relay 42, controlled by a single overload relay coil 43, as shown in Fig. 1, three overload relays 90, 91 and 92 are adapted, respectively, to be controlled by the three overload coils 93, 94, 95 that are connected in the respective leads to the rotor resistors. The coil 37 is included in a shunt circuit which includes the contact members 38 and 39, but not the low-voltage relay 40. A single actuating coil 96 is adapted to control the contactors 9, 10 in the phase conductors 71 and 72 for forward rotation of the motor, and a single contactor coil 97 controls the contactors 13 and 14 for reversing the direction of rotation. Furthermore, the single contactor switches 17 to 20 shown in Fig. 1 are replaced by the pairs of switches 98 and 99, 100 and 101, 102 and 103, 104 and 105 which are respectively actuated by the coils 21 to 24.

The connections of the various switches, the contactor coils and relays with the master controller are substantially the same as those shown in Fig. 1, and the description of the operation of that figure may be read on Fig. 2, taking into account the alteration hereinbefore referred to, and will be readily understood by those skilled in the art without further description.

Figure 3:
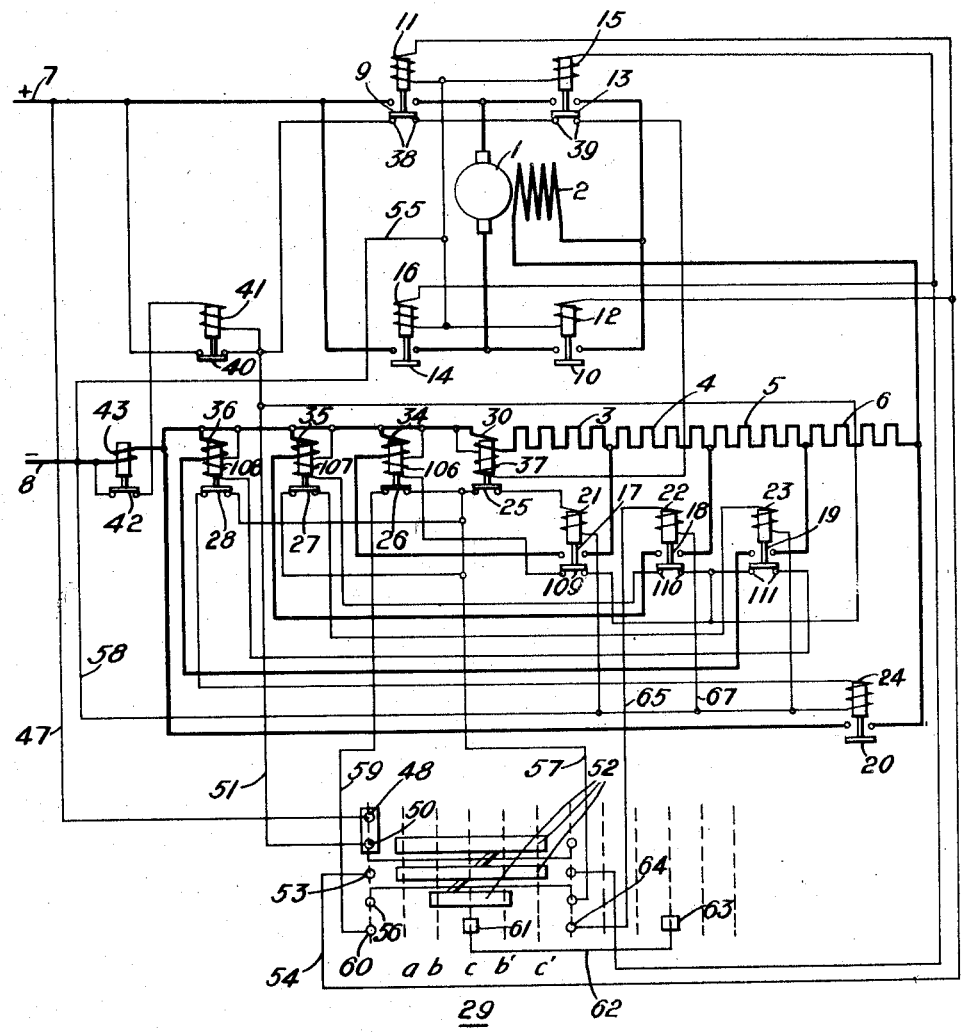

The diagram, Fig. 3, illustrates arrangements similar to those shown in Fig. 1, with the exception that the series coils 31 to 33 of the relays 26 to 28 are replaced by shunt coils 106 to 108, respectively. These shunt coils are controlled by contact members 109, 110, 111 that are included in circuit with them, which are controlled by the contactor switches 17, 18 and 19, respectively. No mechanically connected switches are necessary in the circuits of the coils 21 to 24. The connections of the master controller 29, the relays 25 to 28 and the contactor coils 21 to 24 are the same as those of the diagram, Fig. 1.

In operation, the contact members 38, 39, 109, 110 and 111 are normally closed, so that, as soon as the no-voltage relay 40 is closed by the energization of the coil 41, all the shunt coils 37, 106, 107, 108 of the relays will be energized to effect the opening of the relays. The closure of the contactor switches 9 and 10 or 13 and 14 will open the circuit of the shunt coil 37 by reason of the opening of the contact members 38 or 39, and leave the relay 25 under the control of the series coil 30. When the motor current has fallen to the predetermined value, the relay 25 closes, thereby energizing the contactor coil 21, which closes contactor switch 17 and, consequently, includes the coil 34 of the relay 26 in the motor circuit. The shunt coil 106 of this relay is deenergized by the opening of the contact member 109, which occurs when the contactor switch 17 closes. The remainder of the operation and its control by the master controller 29 take place in a similar manner and will be readily understood from the previous description of Fig. 1.

Figure 4:
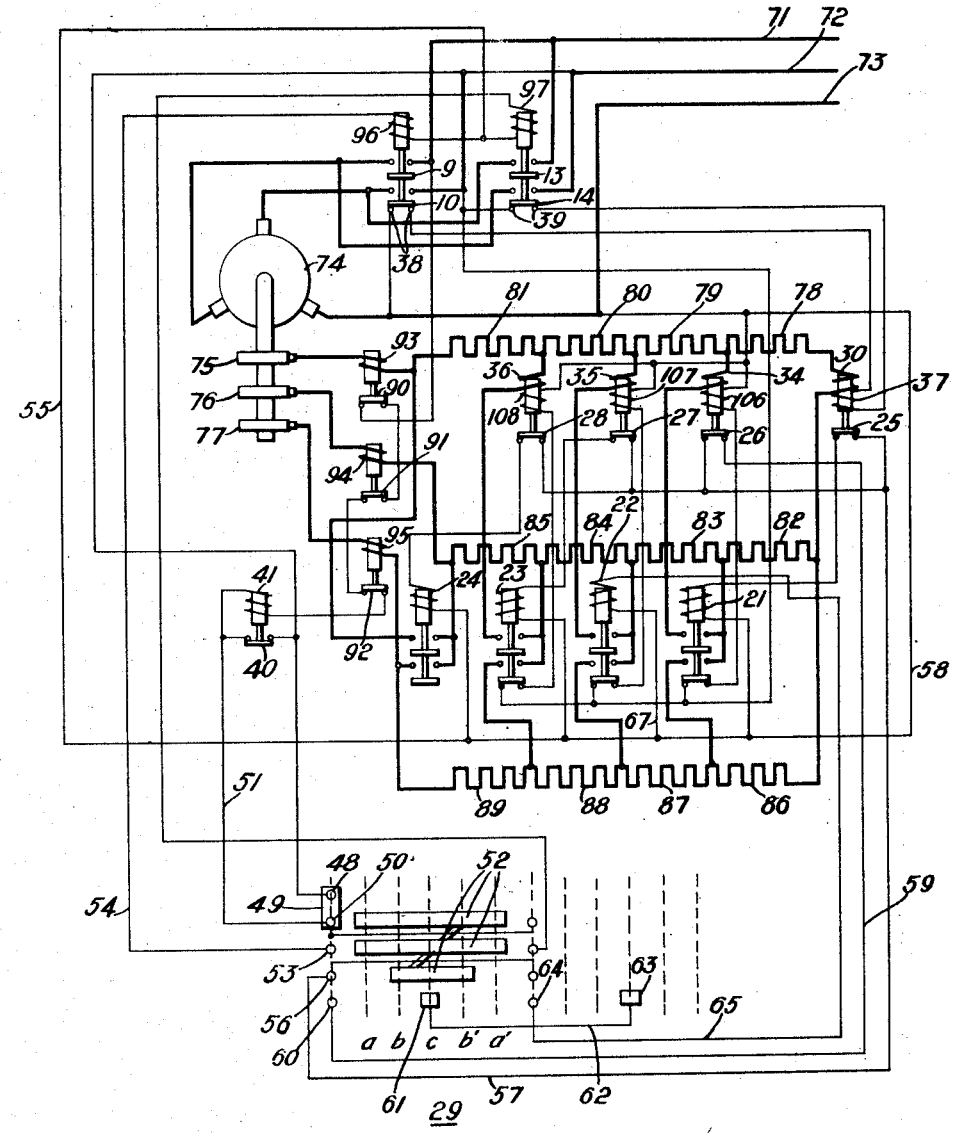

Fig. 4 bears the same relation to Fig. 3 as Fig. 2 does to Fig. 1 of the drawings and shows the arrangements of Fig. 3 applied to an alternating-current motor. The same reference numerals are applied to the same parts as are found in Fig. 2, but in place of the series coils 31, 32, 33 of the relays 26 to 28, shunt coils 106, 107, 108 are connected in circuit with contact members 109, 110, 111, across the phase conductors 72, 73. The operation of the switches, contact members, relays, contactor switches and master controller will be readily understood from the descriptions given of Figs. 2 and 3 and need not be further described.

It will be understood that the actual construction of the various switches, relays, etc. may be of any usual or well known kind. The contactors may either be electromagnetically operated or may be pneumatically operated but electrically controlled, in a manner well known in the art. The master controller 29 may be omitted or replaced by a simple reversing switch when it is not desired to stop the short-circuiting of the resistor section at intermediate steps.

I claim as my invention:—

1. The combination with an electric motor, of a switch for controlling said motor that is biased toward closed position and having a pair of coils one of which is adapted to maintain said switch open, irrespective of the current conditions of said motor, and the other of which is adapted to maintain said switch open only when the current traversing said motor exceeds a predetermined value.

2. The combination with an electric motor having a resistor associated therewith, and a switch for short-circuiting said resistor, of a normally closed relay for controlling said switch in its closed position and having a pair of coils one of which is adapted to open said relay and to maintain it open, irrespective of the current conditions of said motor, and the other of which is adapted to maintain said relay open only when the current traversing said motor exceeds a predetermined value, and means for successively rendering each of said coils separately effective.

3. The combination with an electric motor having an armature, a resistor in series therewith, and a pair of successively operable switches for short-circuiting said resistor, of a relay for the second of said switches to operate having a pair of energizing coils, means for energizing one of said coils to effect the opening of said relay and to maintain it open, and means for deënergizing one of said coils and for energizing the other of said coils upon the operation of the first of said switches to operate, said other coil being adapted to maintain said relay open when the current traversing said armature exceeds a predetermined value and to permit said relay to close when the current traversing said armature falls below said predetermined value.

4. The combination with an electric motor having an armature, a resistor in series therewith, a pair of successively operable switches for short-circuiting said resistor, a normally closed relay for controlling each of said switches in its closed position and a source of energy for said motor, of a coil for each of said relays that is adapted to effect the opening of the corresponding relay, means for connecting the coil of the first relay to operate to said source, a normally deënergized second coil for each of said relays that is adapted to maintain the corresponding relay open only when the current traversing said armature exceeds a predetermined value, means for deënergizing the first-named coil of the first relay to operate and for energizing the normally deënergized coil of the first relay to operate, and means for deënergizing the first named coil and for energizing the normally deënergized coil of the second relay to operate upon the operation of the first of said pair of switches to operate.

5. In a motor-control system, the combination with an electric motor, a starting resistor and a plurality of electromagnetic switches for controlling said resistor, of a plurality of relays for controlling the operation of certain of said switches, each of said relays having actuating means, a portion of which is energized in accordance with the value of the current traversing a portion of the motor circuit, and a second portion of which is controlled in accordance with the position of the preceding switch to operate, and interlocking means for insuring the operation of said switches in a definite sequence.

6. The combination with an electric motor having an armature, a resistor in series therewith, a pair of successively operable switches for short-circuiting said resistor, a pair of relays that are biased to closed position and that are respectively adapted to effect the closing of said switches when said relays occupy their closed position, and a controller having two operative positions, of means for maintaining said relays open, means connected to the first of said relays to operate for preventing the closing of the second of said switches to close when said first relay is open, means for rendering the maintaining means of said first relay ineffective when said controller occupies one of its positions, and means for rendering the maintaining means of the other of said pair of relays ineffective when said controller occupies its other position.

7. In a motor-control system, the combination with an electric motor, a starting resistor and a plurality of electromagnetic switches for controlling said resistor, of a plurality of relays for controlling the operation of certain of said switches, each of said relays having a plurality of actuating coils, one only of said coils being initially energized to control said relay and the other only of said coils being energized to control said relay upon the operation of the preceding switch.

In testimony whereof I have hereunto subscribed my name this 31st day of March, 1919.

LEONARD MILLER.